United States Patent [19]

Waddell et al.

[11] 4,350,363
[45] Sep. 21, 1982

[54] SCRAPER BAIL STOP ASSEMBLY

[75] Inventors: Bennett N. Waddell, Minooka; Larry G. Warren; Eugene M. Wilson, both of Joliet, all of Ill.

[73] Assignee: Caterpillar Tractor Co., Peoria, Ill.

[21] Appl. No.: 136,622

[22] PCT Filed: Jan. 21, 1980

[86] PCT No.: PCT/US80/00055

§ 371 Date: Jan. 21, 1980

§ 102(e) Date: Jan. 21, 1980

[51] Int. Cl.³ .......................................... B60D 1/004
[52] U.S. Cl. ................................................... 280/481
[58] Field of Search ............... 280/481, 477, 487, 489; 74/526; 403/117

[56] References Cited

U.S. PATENT DOCUMENTS

| | | | |
|---|---|---|---|
| 1,329,048 | 1/1920 | Hoover | 403/117 |
| 3,048,934 | 9/1960 | Hancock | 37/129 |
| 3,307,578 | 3/1967 | Chaloka | 74/526 |
| 3,314,341 | 4/1967 | Schulin | 403/117 |
| 3,474,548 | 10/1969 | Miller | 37/8 |
| 3,847,416 | 11/1974 | Hicks | 280/481 |
| 3,861,736 | 1/1975 | Rossler | 296/189 |
| 3,867,750 | 2/1975 | Bleyker | 74/526 |
| 3,977,699 | 8/1976 | Wagatsuma | 280/481 |
| 4,018,452 | 4/1977 | Wagatsuma | 280/481 |
| 4,088,340 | 5/1978 | Joyce | 280/481 |
| 4,109,547 | 8/1978 | Jacobson | 74/526 |

OTHER PUBLICATIONS

"Special Instruction", of Caterpillar Tractor Co., 5-1978.

Primary Examiner—Joseph F. Peters, Jr.
Assistant Examiner—M. J. Hill
Attorney, Agent, or Firm—Phillips, Moore, Weissenberger, Lempio & Majestic

[57] ABSTRACT

A stop assembly (66) for a bail (20) is provided which is particularly useful with the bail (20) of a push-pull scraper (18). The bail (20) is pivotally mounted by a pair of bifurcated brackets (28,30) affixed to the scraper (18), and is normally raised and lowered by a fluid cylinder (38). When the bail (20) is raised, if not positively stopped from further raising, the fluid cylinder could bottom-out or be otherwise damaged. The stop assembly (66) comprises a fixed pin (68) mounted within the bracket (28) in proximity to a pivotal eye portion (22) of the bail (20), and a first surface (76) on the eye portion (22) which engages with the pin (68) when the bail (20) is in a raised position. Engagement of the first surface (76) with the pin (68) stops the bail (20) from being further raised, and protects the fluid cylinder (28) from damage.

5 Claims, 3 Drawing Figures

SCRAPER BAIL STOP ASSEMBLY

DESCRIPTION

1. Technical Field

This invention relates to a bail stop assembly useful with vehicles of the type adapted for interconnection by a pivotal bail, such as the bail of a push-pull scraper.

2. Background Art

Vehicles such as scrapers may include pivotally mounted bails for use in "push-pull" operations. A bail mounted on the front of one scraper is lowered about a hook on the rear of another scraper. The paired scrapers assist each other in loading operations. After loading, the bail is raised, the scrapers separate, and each may proceed with hauling or spreading operations.

Such bails are normally raised and lowered by power means such as fluid cylinders. It is usual to have a stop assembly for the bail which stops the bail in a raised position. If the bail did not have a stop assembly, it could be possible to further raise the bail.

Further raising of the bail, when a fluid cylinder is in association therewith, may lead to bottoming out of the fluid cylinder. Also, as an individual scraper is operated, for example with the bail in a raised position during travel to and fro, obstacles are occasionally encountered which snag, or unevenly load, the bail. If such an uneven load is imposed upon the fluid cylinder, rather than upon the cylinder frame, the cylinder rod of the fluid cylinder could be damaged.

The prior art stop assemblies have been found unsatisfactory. For example, stop assemblies have been known which have included a pair of rearwardly inclined stops each welded to end portions of the bail near the pivotal mounting points thereof, and which stop the bail from further raising when the stops engage the scraper frame. Welding of these stops has frequently led to distortion of the assembly, which has made the timing for bail stopping difficult. That is, the stops have tended not to engage the scraper frame simultaneously.

Also, the prior art stop assemblies have frequently presented pinch-points between the bail stop and the vehicle frame. It has thus been possible for objects such as tools or the like which are accidentally interposed between the bail stop and the vehicle frame to be caught therebetween during raising of the bail.

DISCLOSURE OF THE INVENTION

The present invention is directed to overcoming one or more of the problems as set forth above.

In one aspect of this invention, a vehicle has a bail pivotally mounted in an upper portion of a vertical pocket of a bifurcated bracket for movement between lowered and raised positions. The bail has a surface defined thereon that varies the horizontal dimension of an open top of the pocket upon pivoting of the bail. Means are provided on the bail for engaging a stop member mounted in the bracket to stop the bail at its raised position.

In another aspect of this invention, the engaging means is composed of a softer material than the pin which will wear into conformation with the pin through repeated engagements therewith.

Thus, engagement of the fixed pin with the means for engaging provides a positive, shielded stop for the bail. This protects a fluid cylinder or the like, used to raise and lower the bail, from damage. The means for engaging preferably wears into conforming engagement with the pin. Accordingly, a pair of the stop assemblies (at each end of the bail) substantially overcome the timing problems previously encountered.

BEST MODE FOR CARRYING OUT THE INVENTION

Figure 1:
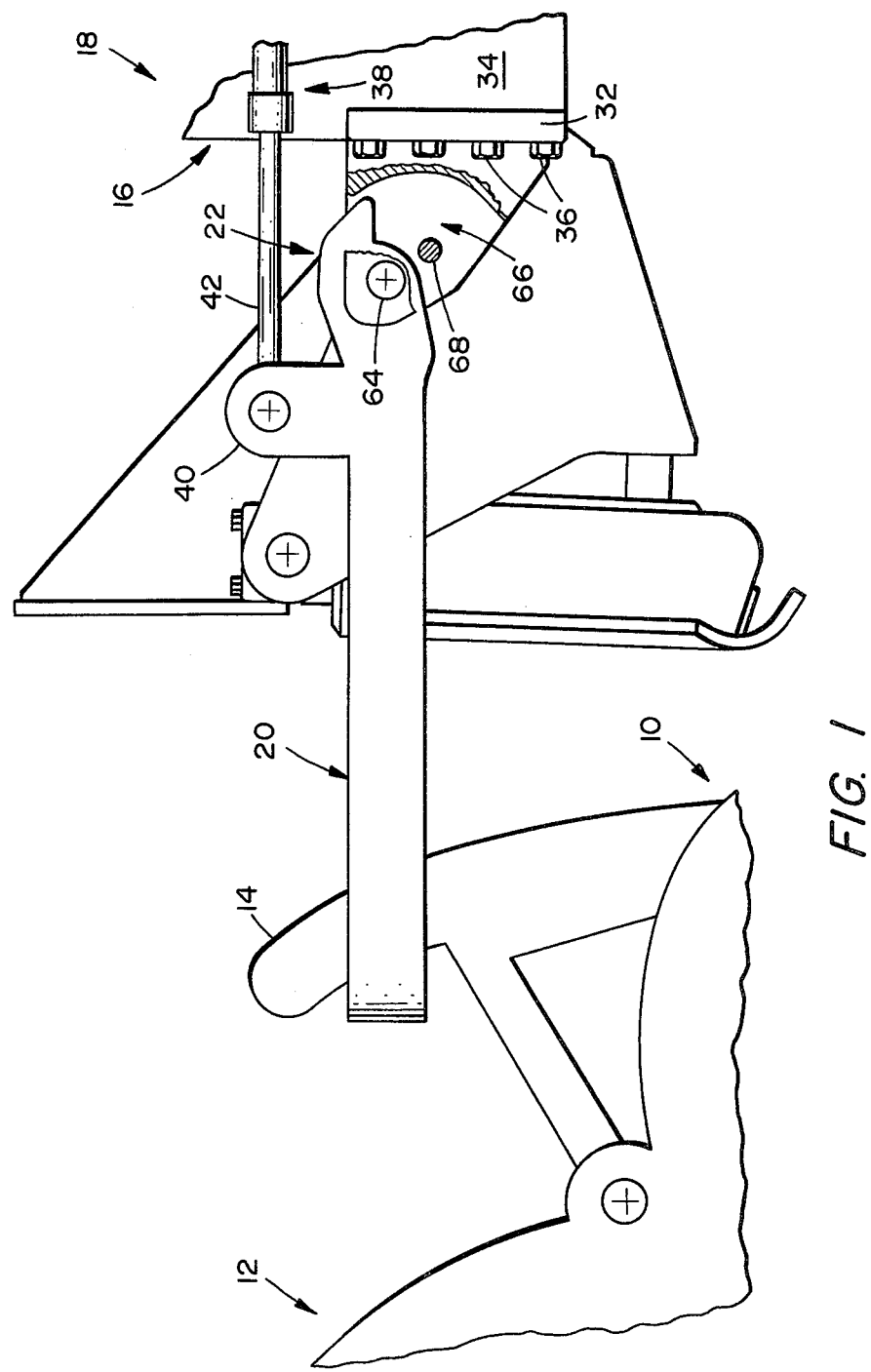
FIG. 1 is a side elevational view, partially broken away and sectioned, of portions of paired push-pull scapers, which illustrates an embodiment of the present invention.
Figure 2:
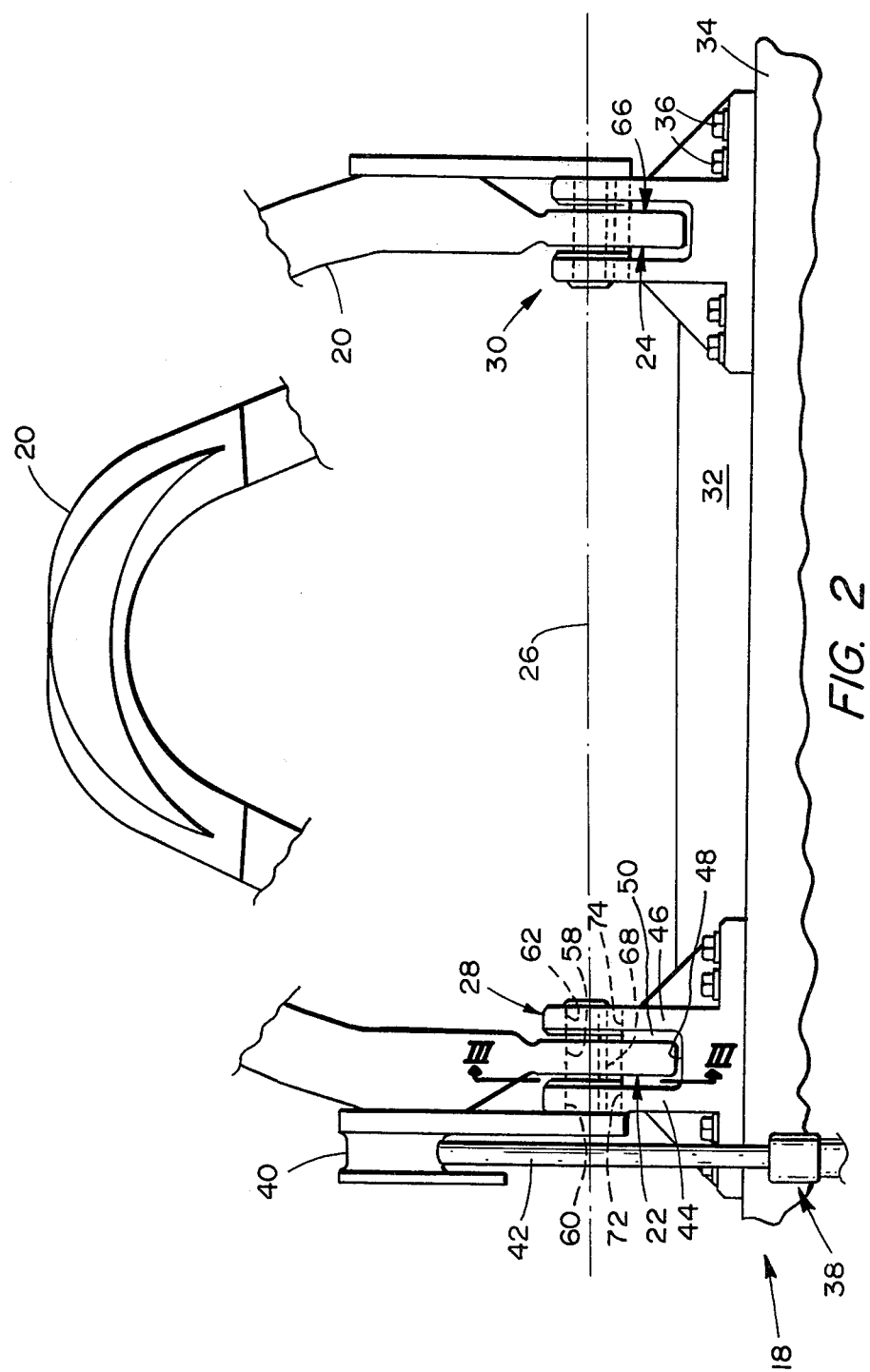
FIG. 2 is a plan view of a bail of one of the paired push-pull scrapers.

Referring to FIG. 1, a rear portion 10 of a push-pull scraper 12 has a pulling hook 14. A front portion 16 of another push-pull scraper 18 includes a bail 20. The bail 20 is pivotally mounted at eye portions 22 and 24 thereof to the front portion 16 of scraper 18. (FIG. 1 illustrates only the eye portion 22, whereas both eye portions 22 and 24 are illustrated in FIG. 2). The pivotal mounting of bail 20, although conventional, is important to an understanding of the present invention and thus will now be more fully described.

Turning to FIG. 2, it may be seen that the bail 20 is generally "V" shaped and that opposed eye portions 22 and 24 are each pivotal about a horizontal axis 26. A pair of bifurcated brackets 28, 30 are normally each an integral part of and outwardly extend from a main, longitudinally extending bracket 32. The bracket 32 is affixed to a frame 34 of scraper 18 along the front portion 16 thereof. Means such as bolts 36 ensure rigid affixation of the main bracket 32 to scraper 18.

As illustrated in FIG. 2, the eye portion 22 is associated with the bracket 28 whereas the eye portion 24 is associated with the bracket 30. The eye portions 22 and 24 and their associated brackets 28 and 30 are substantially identical. However, the bail 20 is normally raised and lowered by only one fluid cylinder 38, or power means, which is operatively associated with the bail 20 adjacent either the eye portion 22 or the eye portion 24. Such operative association of fluid cylinder 38 with bail 20 is herein illustrated as being adjacent the eye portion 22.

A tilt lever 40 is connected to the bail 20 adjacent the eye portion 22. A rod 42 of fluid cylinder 38 is connected to the tilt lever 40. Control of the fluid cylinder 38 and its actuation for raising and lowering the bail 20 is conventional and not further discussed. For convenience, only the eye portion 22 and its associated bracket 28 will be hereinafter discussed, but it should be understood that description of the eye portion 22 and bracket 28 represent description of both eye portions 22 and 24 and their associated brackets 28 and 30, unless otherwise noted.

Figure 3:
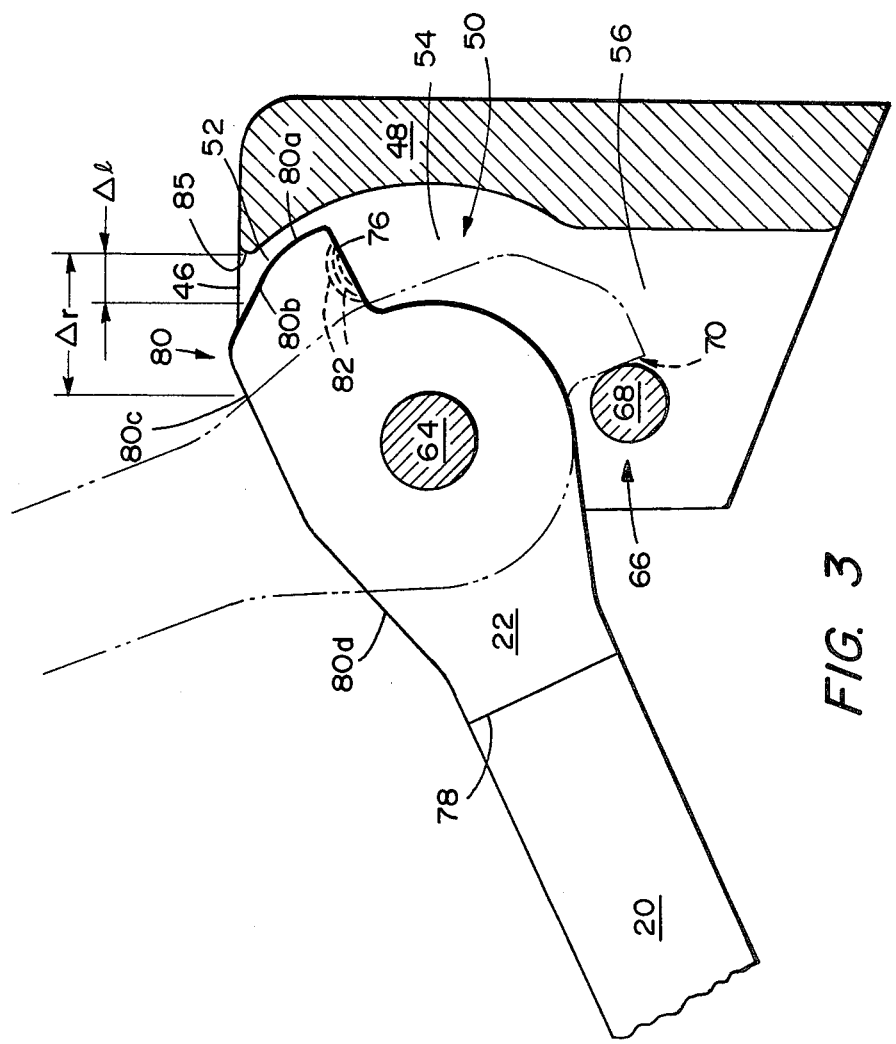
FIG. 3 is an enlarged cross sectional view, taken along line III—III of FIG. 2.

Turning to FIG. 2, the bracket 28 has a pair of opposed, upstanding side walls 44, 46 and an upstanding end wall 48. The side walls 44, 46 and end wall 48 define a vertically extending, "U" shaped pocket 50. Referring to FIG. 3, the pocket 50 has an open top 52, an upper portion 54, and a lower portion 56.

Referring to FIG. 2, the eye portion 22 has a circular hole 58 passing therethrough which is alignable between a pair of circular first bores 60,62, each of which passes through a respective one of the side walls 44 and 46. A pivot pin 64 is inserted through first bore 60, hole 58 and first bore 62 to form the pivotal mounting of bail 20 to the front 16 of scraper 18. Referring to FIG. 3, it may be seen that the pivot pin 64, on which eye portion 22 pivots, is located within the upper portion 54 of pocket 50.

The present invention is an improved stop assembly embodiment, denoted generally as stop assembly 66, which is combined with the above-described pivotally mounted bail 20. The improvement comprises a stop member in the form of a pin 68 and means 70 for engaging pin 68. The pin 68 is proximate the pivotal mounting of bail 20, more particularly is closely beneath the pin 64 on which eye portion 22 pivots. The means 70 engages with the pin 68 to prevent further movement of the bail 20 toward the raised position.

The pin 68 is substantially cylindrical and preferably formed of hardened steel. Pin 68 is fixedly mounted in the lower portion 56 of pocket 50. Referring to FIG. 2, a pair of second bores 72 and 74 are machined in a respective each of the side walls 44 and 46 to be proximate to the first bores 60,62. The pin 62 is inserted into the second bores 72,74 so as to be affixed to one of the side walls 44, 46 and engaged with a respective other of the side walls 44, 46.

Turning to FIG. 3, it may be seen that the pin 68 extends across the lower portion 56 of pocket 50 and is a predetermined, proximate distance below the pivotal mounting of the bail 20. The means 70 includes a first surface 76 on the eye portion 22 of bail 20. The eye portion 22 is normally formed as a steel casting which is welded to bail 20 by a neck portion 78 of eye 22. Preferably, first surface 76 is relatively softer than the hardened steel pin 68. The first surface 76 is substantially planar when cast and extends radially inwardly from a peripheral second surface 80 of the eye portion 22. The inward extension of first surface 76 is toward, but does not extend to, hole 58 of eye portion 22.

FIG. 3 illustrates in phantom the engagement of the first surface 76 with pin 68 when bail 20 has been pivoted upwardly or raised. Since pin 68 is firmly affixed between the side walls 44, 46, the engagement between pin 68 and first surface 76 does not permit bail 20 to be further raised. Thus, such engagement defines a raised position of the bail 20 and positively stops the bail 20 from further raising.

As already noted, the first surface 76 is substantially planar when formed, or cast, but is of a material which is relatively softer than that of the cylindrical pin 68. Accordingly, engagement of the first surface 76 with the pin 68 will initially be substantially tangential thereto. However, as the bail 20 is rasied and lowered in the course of scraper operations, the first surface 76 may wear into arcuate confirmation with the cylindrical pin 68. The progressive wearing is represented in FIG. 3 by a series of dashed arcuate lines 82.

As may be understood, there will normally be a pair of the stop assemblies 66, each of which is associated with a respective one of the eye portions 22 and 24. The just described wearing conformation enables the eye portions 22 and 24 to be substantially simultaneously stopped when bail 20 is raised, despite minor distortions of the bail 20.

The end wall 48 located in the vicinity of upper portion 54 may be either semi-spherical, as illustrated, or planar. The end wall 48 has a terminal point 85 located adjacent the open top 52 of pocket 50. The peripheral second surface 80 of the eye portion 22, which pivots past this terminal point 85 as the bail 20 is raised, is of a construction sufficient for varying a horizontal dimension, or distance, $\Delta r$ of the open top 52. Variable distance $\Delta r$ is defined between terminal point 85 and second surface 80.

The peripheral second surface 80 is formed by a plurality of second surface portions 80a–d which contiguously extend between the first surface 76 and the neck portion 78 of eye portion 22. The portion 80a is contiguous with the first surface 76 and is substantially curved. The degree of curvature thereof corresponds generally to the curvature of the upper portion 54 of pocket 50. The next contiguous portion 80b is flattened inwardly from such curvature to be substantially a secant thereof. The remaining portions are similarly flattened inwardly. That is, the radial dimension between the center of hole 58 and second surface 80 increases from surface portion 80d to surface portion 80a. The second surface 80 generally describes a helix. The purpose for such configuration of the second surface 80 will now be explained.

Referring to FIG. 3, when the bail 20 has been fully lowered, a distance $\Delta l$ is defined at the open top 52 between the second surface 80, more particularly the second surface portion 80b, and the end wall terminal point 85. This distance $\Delta l$ is relatively small. Referring to the phantom representation of the eye portion 22, when the bail 20 has been raised, a distance $\Delta r$ is defined at the open top 52 of pocket 50 between the second surface 80, more particularly the second surface portion 80d and the end wall terminal point 85. The distance is considerably larger than the distance $\Delta l$. That is, during raising of the bail 20, the distance between the pivoting eye portion 22 and the fixed, end wall terminal point 85 increases. Accordingly, if an object is inadvertently interposed into the open top 52 of pocket 50 when the bail 20 is in its lowered position, such an object may usually be removed during raising of the bail 20. Thus, the stop assembly 66 does not form an exposed pinch-point.

Industrial Applicability

The stop assembly 66 finds particular application for stopping the bail of a push-pull scraper. However, the stop assembly will find other applications, for example, on other types of vehicles.

Referring to FIG. 2, each of the eye portions 22 and 24 will normally have a stop assembly 66 associated therewith. When the bail 20 is raised, both eye portions 22, 24 pivot in both pockets 50 until both first surfaces 76 engage pins 68. This engagement positively stops the bail 20 from further raising, and is substantially simultaneous. Such engagement occurs prior to the full retraction of the rod 42 within fluid cylinder 38. Accordingly, potential damage to the fluid cylinder 38, due to uneven loading on bail 20, bottoming out and the like, is prevented.

Other aspects, objects, and advantages of this invention can be obtained from the study of the drawings, the disclosure and the appended claims.

We claim:

1. In a vehicle (18) having a bail (20) pivotally mounted thereto, said bail (20) being movable from a lowered position toward a raised position, the improvement comprising:

a bifurcated bracket structure (28) mounted on said vehicle (18) and defining a vertically extending pocket (50) having a stop member (68) mounted therein, said bail (20) being pivotally mounted in said bracket structure (28), said bracket structure (28) being adapted to provide a shielded stop for said bail (20);

said vertically extending pocket (50) having a lower portion (56), an upper portion (54), and an open top (52), said bail being pivotally mounted in said upper portion (54) of said pocket (50) and having a surface (80) thereon being pivotal in said open top (52), said surface (80) being of a construction sufficient for varying a horizontal dimension ($\Delta r$) of said open top (52) as said surface (80) pivots therein; and means (70) for engaging said stop member (68) to prevent further movement of said bail (20) toward the raised position, said engaging means (70) being mounted on the bail (20).

2. The improvement, as set forth in claim 1, wherein said means (70) for engaging includes a first surface (76) on said bail (20) being composed to wear into conformation with said stop member (68) through repeated engagements therewith, said first surface (76) being contained within said bracket structure (28).

3. In a vehicle (18) adapted to interconnect with a second vehicle (12) by a pivotally mounted bail (20), the pivotal mounting being by a pair of eye portions (22,24) of said bail (20), and said bail (20) being raised and lowered by a power means (38), the improvement (66) comprising:

a pair of brackets (28,30) each having a vertically extending pocket (50), each of said eye portions (22,24) of said bail (20) being pivotally mounted in the vertically extending pocket (50) of a respective one of said pair of brackets (28,30);

a cylindrical stop pin fixed within a lower portion (56) of each of said pockets (50); and a first surface (76) on each of said eye portions (22,24) being adapted to engage with said stop pin (68), said first surfaces (76) being positioned to substantially simultaneously engage with said stop pins (68) in a raised position of said bail (20), said stop pins (68) being of a construction sufficient to stop said bail (20) from further raising by said power means (38) when engaged with said first surfaces (76), and said first surfaces (76) being composed of a material relatively softer than that of said stop pins (68) and adapted to wear into arcuate conformation (82) with said stop pins (68) through repeated engagements therewith.

4. A bail stop assembly (66) for a vehicle (18) of the type adapted for interconnection with a second vehicle (12) by a pivotal bail (20) being movable from a lowered position toward a raised position, comprising:

a bifurcated bracket structure (28) mounted on said vehicle (18) and having a stop member (68) mounted in a lower portion (56) of said bracket structure (28), said bail (20) being pivotally mounted on said bracket structure (28) at an upper portion (54) thereof, said stop member (68) being proximate said pivotal mounting of said bail (20); and, a first surface (76) defined on said bail (20) adjacent the pivotal mounting thereof, said first surface (76) being contained within said bracket structure (28) and being adapted to engage with said stop member (68) to prevent further movement of said bail (20) toward the raised position, said first surface (76) being formed of a material which is relatively softer than that of said stop member (68) and being adapted to wear into conformation with said stop member (68) through repeated engagements therewith.

5. In a vehicle (18) having a bail (20) pivotally mounted thereto, said bail being movable from a lowered position toward a raised position, the improvement comprising:

a bracket structure (28) mounted on said vehicle (18) and having a cylindrical pin (68) mounted therein, said bail (20) being pivotally mounted in said bracket structure (28), said bracket structure (28) and said cylindrical pin (68) cooperating to provide a shielded stop for said bail (20); and means (70) for engaging said cylindrical pin (68) and preventing further movement of said bail (20) toward the raised position, said engaging means (70) including a first surface (76) on said bail (20) said first surface (76) being contained within said bracket structure (28) and being composed of a material which is relatively softer than that of said pin (68) so that said first surface (76) will wear into conformation with said pin (68) through repeated engagements therewith.

* * * * *